United States Patent Office 2,997,346
Patented Aug. 22, 1961

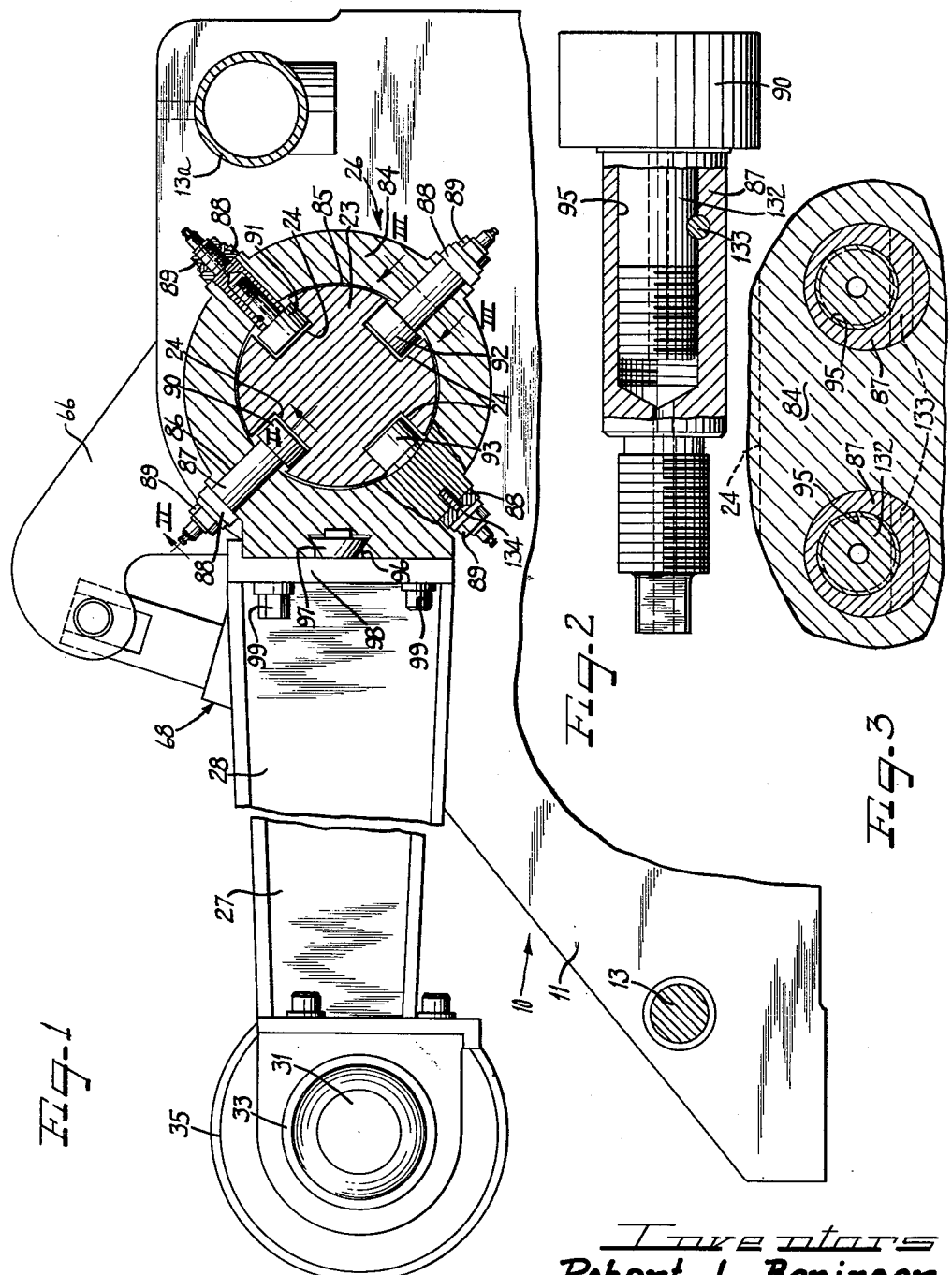

2,997,346
BEARING ASSEMBLY
Robert L. Beninger, Sheboygan, and Paul W. Jacobsen, Kiel, Wis., assignors to H. G. Weber and Company, Inc., Kiel, Wis., a corporation of Wisconsin
Original application Feb. 16, 1956, Ser. No. 565,907. Divided and this application Sept. 25, 1958, Ser. No. 763,279
3 Claims. (Cl. 308—6)

The present invention relates to a bearing assembly, and more particularly relates to a bearing assembly which permits a shaft and a housing to be relatively axially slidable, while being angularly corotatable.

While it will be appreciated that mechanisms embodying the principles of the present invention are of general utility, an embodiment thereof exemplifying the invention is described below and in detail by way of example only and without any intention of limiting the scope of the patent thereby. Thus the device with which the instant invention is disclosed clearly brings out the utility of the instant invention.

The present invention contemplates the utilization of a main shaft having axially extending splines about which there is disposed a housing. To the housing there is secured a number of rollers which are supported by the housing but which are disposed within the grooves of the main shaft for engagement with a face thereof. The rollers, being fixed to the housing, permit the housing to move axially of the shaft, but preclude angular movement between the housing and the main shaft.

Accordingly, it is an object of the present invention to provide an improved bearing assembly of the type which permits relative axial movement between two members, but limits relative angular movements therebetween.

Still another object of the present invention is to provide a new and improved shaft and bearing housing arrangement wherein the shaft is splined and the bearing housing carries a plurality of sets of adjustable rollers whereby the bearing housings are movable axially of the shaft but fixed for corotation with the shaft.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

On the drawing:

FIGURE 1 is a fragmental side view of a device having the bearing assembly thereof provided in accordance with the principles of the instant invention, such bearing assembly being shown in cross-section;

FIGURE 2 is a sectional view of a traverse bearing roller assembly viewed as taken substantially along the line II—II of FIGURE 1; and FIGURE 3 is a sectional view of a pair of roller assemblies such as shown in FIGURE 2, viewed as taken substantially along the line III—III of FIGURE 1 and enlarged.

As shown on the drawing:

The principles of this invention may be incorporated in various devices. An application of particular utility is shown in FIGURE 1 wherein a roll stand is generally indicated by the numeral 10. The roll stand 10 includes an end support 11, to which a pair of tie rods 13 and 13a are secured.

A main shaft 23 is supported by the end support 11, such support in the instant example being a journalled rotatable support. To the far end of the shaft 23, there is secured a lift arm 66 to which is coupled a power actuator 68 acting with respect to the end support 11 for rotating or rocking the main shaft 23.

As shown in section in FIGURE 1, there is disposed about the main shaft 23 a bearing assembly generally indicated by a numeral 26. To this end, the main shaft 23 is adapted to engage the bearing assembly 26 such as by being provided with a group of axially extending outwardly opening grooves 24 which are disposed in parallel relation to each other along the length of the main shaft 23.

The bearing assembly 26 includes a housing 84 which has a radial aperture 85 extending therethrough for receiving the shaft 23. The bearing assembly 26 is provided with a series of axially spaced sets of rollers, identical in structure, one such set being illustrated in FIGURE 1. Thus, this embodiment includes four aligned radial apertures 86 disposed in quadrature in the housing 84, and so placed as to be aligned with the grooves or slots 24 in the shaft 23. Each of these apertures 86 is interfitted with a roller shaft 87 journalled therein, which roller shaft is best illustrated in FIGURES 2 and 3. FIGURE 1 illustrates, however, that these shafts are mounted on a roller support plate 88, one for each axially aligned series of rollers, and are secured in place by each being provided with a nut 89 threaded onto a reduced portion at the outer end or stem of the shaft 87 to lock the shaft 87 onto the support plate 88 between the nut 89 and a shoulder defined by the reduced portion of the roller shaft 87. By loosening the nuts 89, each roller shaft 87 may be rotated within the radial aperture 86 in which it is disposed for adjusting the position of a roller 90 journalled on a pin insert 132 carried in the roller shaft 87. The support plate 88 may be secured to the housing 84 by any convenient means, such as by one or more screws 134.

In FIGURE 1, the four rollers shown are numbered 90, 91, 92, and 93 with each such roller representing a longitudinally aligned series thereof. By adjusting the rollers as shown so that the rollers 90 and 93 lie against relatively adjacent sides of the grooves 24 in which they are fitted, and so that the rollers 91 and 92 lie against the adjacent sides in the grooves in which they are fitted, the bearing assembly 26 including the housing 84 thereof may be fixed on the shaft so as to preclude any possible relative rotation thereof. Considering for example the rollers 92 and 93, it is also apparent that the rollers may be disposed to engage oppositely directed faces of grooves 24, one face being directed clockwise and the other face being directed counterclockwise. Considering rollers 90 and 91, it is also apparent that they act to support the housing 84 on the main shaft 23.

By having the position of the rollers 90—93 adjustable, the rollers are provided with the advantage of permitting long life through adjustability to take up for wear thereon and on the splined shaft. Adjustability further permits the use of larger manufacturing tolerances. Adjustability of the rollers is obtained by the construction of the shaft 87 carrying or supporting a roller, as illustrated in FIGURES 2 and 3, wherein it is shown that the shaft 87 is hollow and receives the pin insert 132, the hollow portion being indicated by the numeral 95. Thus individual rollers 90—93 are journalled upon the pins 132. The bore or recess 95 which receives the pin insert 132 has an axis which is parallel to but eccentric from the outside cylindrical surface of the roller shaft 87, and hence also of the aperture 85 in the housing 84. With this configuration, a rotation of the shaft 87 effects adjustable movement of the roller toward or away from an individual sidewall or face of a groove 24 in which the roller is disposed. This adjustability may also be employed to provide a means for locking the housing against axial movement along the main shaft 23.

While the pin insert 132 that supports a roller may be made integral with the shaft 87, it is preferred that it be constructed as shown so that the appropriate material may be selected for each part thereof. When thus made, it is also preferable to provide means, such as a lock pin 133 which prevents any displacement between the pin insert 132 and the roller shaft 87.

Both of the roller shaft 87 and the pin insert 132 are made hollow so that the assembly can receive lubricant for the roller. To this end, a grease fitting of a known type may be secured to the radialy outer end of each of the roller shafts 87 as shown in FIGURE 1.

When the bearing assembly 26 is embodied in a roll stand, the housing 84 may be adapted to support an arm 28. An additional bearing assembly may be employed to support a second arm such as shown at 27. To the outer end of the arms 27 and 28 there is secured a chuck 31 having a core engaging flange 33, the chuck 31 typically being provided with a brake assembly indicated at 35. The bearing housing 84 has a tongue receiving slide bar groove 96 therein to receive a tongued slide bar 97 on the foot or inner end of the arm 28. Additionally the foot end 98 of the arm 28 is apertured for alignment selectively with a plurality of sets of threaded recesses in the bearing housing 84 to receive a plurality of cap screws 99 which further secure the arm 28 onto the bearing housing 84 in any selected position therealong.

This structural arrangement thus positively locks the arms 27 and 28 of the roll stand 10 onto the bearing housings 84 of the traverse bearing assemblies and positively locks the traverse bearing assemblies on the main shaft 23 for corotation of the arms and the main shaft 23, and for axial movement of the arms 27 and 28 along the main shaft 23.

Although various minor modifications might be suggested by those versed in the art, it should be understood that we wish to embody within the scope of the patent warranted hereon all such embodiments as reasonably and properly come within the scope of our contribution to the art.

This application is a division of application Serial No. 565,907 filed February 16, 1956.

We claim as our invention:

1. In combination: a main shaft, said shaft having four parallel angularly-spaced axially-extending outwardly-opening grooves on its outer surface, each of said grooves being defined by a pair of confronting support faces; a housing extending about said main shaft and being relatively slidable therealong axially, said housing having a series of apertures therethrough opening into said grooves; a series of roller shafts each carried by said housing in one of said apertures, and adapted to be externally rotated and locked in a selected angular position; and a series of rollers, each carried on the inner end of one of said roller shafts and rotatable about an axis eccentric to the axis of its roller shaft, each of said rollers being disposed in one of said grooves intermediate the support faces thereof and being alternatively engageable with both of said support faces in response to angular repositioning of its roller shaft.

2. In combination: a main shaft, said shaft having four parallel angularly-spaced axially-extending outwardly-opening grooves on its outer surface, each of said grooves being defined by a pair of confronting support faces; a housing extending about said main shaft and being relatively slidable therealong axially, said housing having a series of radial apertures therethrough, each coaxial with another of said apertures, and each opening into said grooves; a series of roller shafts each carried by said housing in one of said apertures, and adapted to be externally rotated and locked in a selected angular position; and a series of rollers, each carried on the inner end of one of said roller shafts and rotatable about an axis eccentric to the axis of its roller shaft and parallel to both of said support faces of the adjacent groove, each of said rollers being entirely disposed in one of said grooves intermediate the support faces thereof and being alternatively engageable with both of said support faces in response to angular repositioning of its roller shaft.

3. In combination: a main shaft, said shaft having four parallel angularly-spaced axially-extending outwardly-opening grooves on its outer surface, each of said grooves being defined by a pair of confronting support faces; a housing extending about said main shaft and being relatively slidable therealong axially, said housing having a series of apertures therethrough opening into said grooves; a series of roller shafts each carried by said housing in one of said apertures; four separate support plates detachably secured to sid housing, and having apertures aligned with said housing apertures, said plate apertures being smaller than said housing apertures to define an annular inwardly facing shoulder on the plate at each housing aperture; said roller shafts each having a reduced end portion extending through one of said plate apertures and beyond the plate, and defining a shoulder engaging the plate shoulder; means acting between said reduced end portion of each of said roller shafts and the plate and operative to selectively lock the roller shaft in a selected angular position, the reduced end portion of each of said shafts being adapted to be selectively rotated when unlocked; and a series of rollers, each carried on the inner end of one of said roller shafts and rotatable about an axis eccentric to the axis of its roller shaft, each of said rollers being disposed in one of said grooves intermediate the support faces thereof and being alternatively engageable with both of said support faces in response to angular repositioning of its roller shaft.

References Cited in the file of this patent

UNITED STATES PATENTS

| | | |
|---|---|---|
| 2,003,281 | Bijur | June 4, 1935 |
| 2,118,514 | Johnson | May 24, 1938 |
| 2,242,336 | Atwood | May 20, 1941 |
| 2,303,715 | Alvord | Dec. 1, 1942 |
| 2,394,889 | Blanchard | Feb. 12, 1946 |

FOREIGN PATENTS

| | | |
|---|---|---|
| 556,101 | Germany | Aug. 2, 1932 |
| 558,935 | Great Britain | Jan. 27, 1944 |
| 1,032,344 | France | Mar. 25, 1953 |